(12) United States Patent
Severinsson

(10) Patent No.: US 7,497,306 B2
(45) Date of Patent: Mar. 3, 2009

(54) DISC BRAKE

(75) Inventor: Lars Severinsson, Hishult (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 11/374,636

(22) Filed: Mar. 13, 2006

(65) Prior Publication Data
US 2006/0201756 A1    Sep. 14, 2006

Related U.S. Application Data

(63) Continuation of application No. PCT/SE2004/001374, filed on Sep. 24, 2004.

(30) Foreign Application Priority Data

| Sep. 25, 2003 | (SE) | ................................ 0302553 |
| Sep. 25, 2003 | (SE) | ................................ 0302554 |
| Jun. 10, 2004 | (SE) | ................................ 0401480 |

(51) Int. Cl.
*F16D 55/14* (2006.01)
(52) U.S. Cl. ................................ 188/72.2
(58) Field of Classification Search ............... 188/72.6, 188/72.7, 70 B, 72.2
See application file for complete search history.

(56) References Cited

U.S. PATENT DOCUMENTS

| 2,981,376 | A | * | 4/1961 | Zeidler ...................... 188/71.5 |
| 3,651,897 | A | | 3/1972 | Hahn ........................ 188/72.2 |
| 3,893,545 | A | * | 7/1975 | Burnett ...................... 188/72.6 |
| 3,997,033 | A | * | 12/1976 | Bulmer ...................... 188/72.7 |
| 4,016,957 | A | * | 4/1977 | Osujo et al. ................ 188/72.7 |

FOREIGN PATENT DOCUMENTS

WO    WO 03/071150 A1    8/2003

OTHER PUBLICATIONS

International Search Report dated Jan. 11, 2005, 2 pages.

* cited by examiner

*Primary Examiner*—Robert A Siconolfi
*Assistant Examiner*—James K Hsiao
(74) *Attorney, Agent, or Firm*—St. Onge Steward Johnston & Reens LLC

(57) ABSTRACT

A disc brake with self-servo effect comprises: a movable ramp plate connected to a brake pad for engagement with a brake disc, a ramp bridge, stationary in relation to the ramp plate, rollers movable in ramps in surfaces facing each other of the ramp plate and the ramp bridge, and means for imparting a control movement on the ramp plate. The arrangement is such that a movement of the ramp plate in the tangential direction of the brake disc will cause it to move towards or away from the brake disc. Slack adjusting means for compensating for the wear of the brake pad are arranged between the ramp plate and the brake pad.

21 Claims, 10 Drawing Sheets

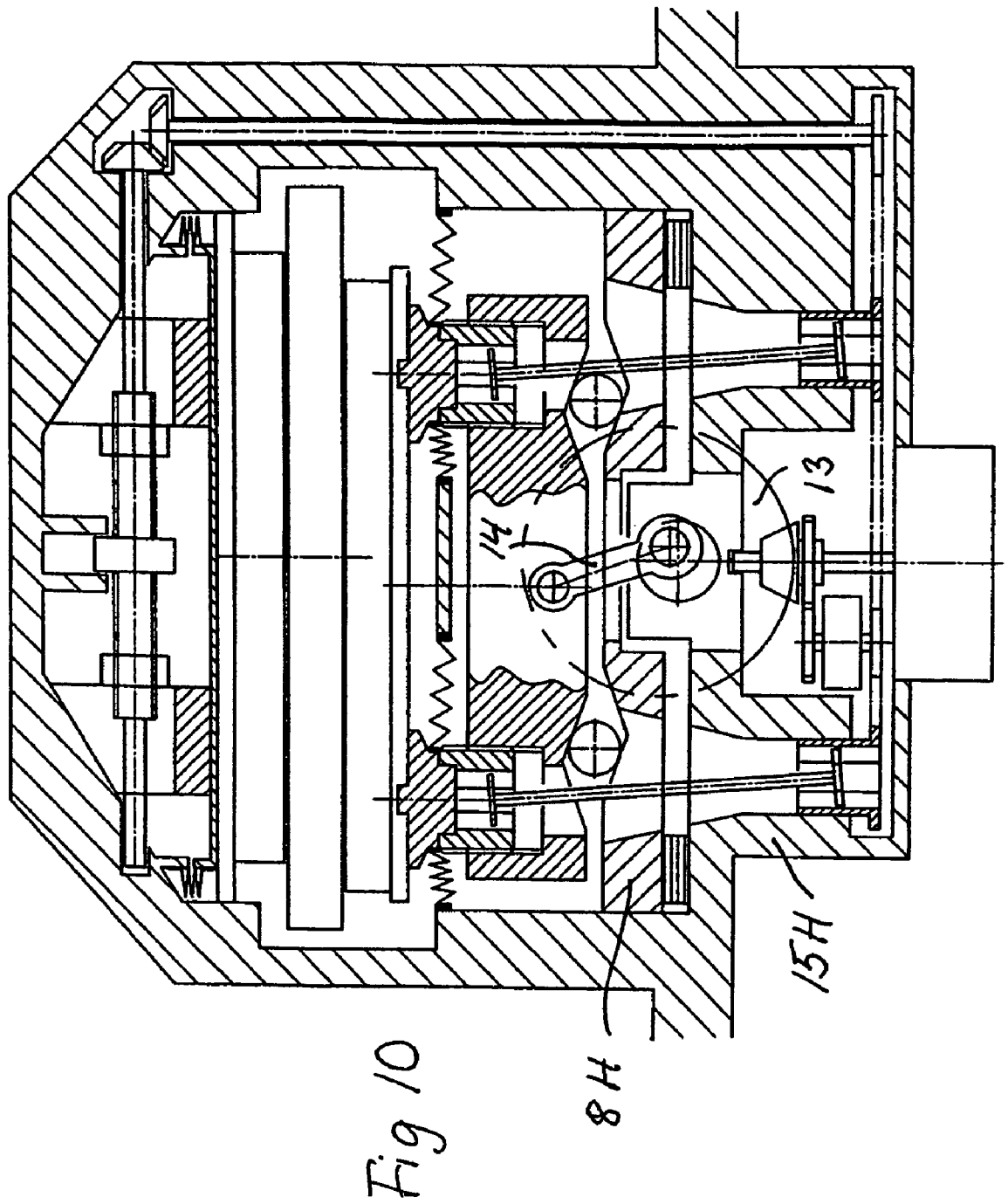

DISC BRAKE

CROSS-REFERENCE TO RELATED APPLICATIONS

This application is a continuation of international patent application PCT/SE2004/001374 filed on Sep. 24, 2004 which designates the United States and claims priority from Swedish patent applications SE 0302554-1 filed on Sep. 25, 2003, SE 0302553-3 filed on Sep. 25, 2003, and SE 0401480-9 filed on Jun. 10, 2004, the content of which is incorporated herein by reference.

FIELD OF THE INVENTION

The present invention relates to disc brakes, and in particular, a disk brake with self-servo effect, comprising: a movable ramp plate connected to a brake pad for engagement with a brake disc, a ramp bridge, stationary in relation to the ramp plate, means for imparting a control movement on the ramp plate, and application members between the ramp plate and the ramp bridge for increasing the mutual distance—in the axial direction of the brake disc—between these two members at a relative movement in the tangential direction of the brake disc, such application members for example being rollers movable in ramps in surfaces facing each other of the ramp plate and the ramp bridge.

BACKGROUND OF THE INVENTION

It is well known in the art that a self-servo effect for a disc brake on a vehicle may be obtained by applying a brake pad against the rotating brake disc, where the brake pad is tangentially movable in relation to the brake disc over inclined ramp means or the like.

The basic problem with such designs was earlier the relatively poor controllability, but actuation by electric motors with modern electronics and with sensors has generally solved this problem. Actuation by other means, such as electro-hydraulic means, is also possible.

A disc brake with self-servo effect as defined above is disclosed in WO 03/071150 from the same applicant as in the present case. In the design shown therein (reference being made especially to FIGS. 4 and 5) its ramp bridge is connected—by means of a slack adjusting arrangement—to a fixed portion of the disc brake (its housing) at its side facing from the brake disc. As the ramp bridge thus is movable in the axial direction of the brake disc, whereas essential portions of the means for imparting a control movement on the ramp plate (namely an electric motor and associated elements) are arranged in the fixed portion of the disc brake (namely in its housing), a relatively complicated design for the mechanism for imparting the control movement will result. Further, in the known design there is a direct and short heat transfer distance from the brake pad to the comparatively sensitive roller mechanism via the ramp plate, which can be seen as a drawback.

The main object of the invention is to remove the above and other shortcomings of the known design.

SUMMARY OF THE INVENTION

This is according to the invention attained in that slack adjusting means for compensating for the wear of the brake pad are arranged between the ramp plate and the brake pad.

This means that the ramp bridge does not need to be axially movable for slack adjusting with a resulting simplification of the design for transmitting the control movement. Also, an improved journalling of a vital part in the means for imparting a control movement may be obtained.

Further, the distance between the brake pad, which generates heat, and the possibly heat sensitive portions of the mechanism will be increased, and heat transfer can only occur via the slack adjusting means, not over the entire ramp plate area.

In practice, the slack adjusting means comprise two first adjustment screws in thread engagement with corresponding bores in the ramp plate and rotatably connected to a front pad holder for the brake pad. Each of the first adjustment screws is rotatably connected to a socket attached to the pad holder.

Each of the first adjustment screws is controllably connected to the means for imparting a control movement. In practice, rotative movement may be transmitted at will from an electric motor—of the means for imparting a control movement—to the first adjustment screw via an adjustment rod in form engagement with the first adjustment screw for allowing ramp plate movements occurring at brake application.

In order to control the slack adjusting procedure, an electromagnetic clutch may be arranged in the force transmitting chain from the electric motor to the adjustment rod.

The environment under a moving vehicle and around its brakes is extremely harsh, and measures must be taken to ensure that moist, dirt and the like is effectively prevented from entering the brake mechanism. In the present case, the sealing of the brake mechanism at the side facing the brake pad and the brake disc, where two slack adjusting means extend between the ramp plate and the pad holder, presents a problem. This problem is according to an important aspect of the invention solved in that a brake mechanism opening, facing the brake disc, is sealed against the intrusion of moist, dirt and the like by means of a lid, which is attached to a sidewall defining the opening and which is provided with a generally circular hole for each slack adjusting means, in which hole a sealing bellows is arranged around the adjusting means. Such a generally ring-shaped bellows will allow lateral and axial movements of the slack adjusting means, which otherwise pose problems.

Practically, the adjustment rod is in form engagement with an adjustment sleeve, rotatable by means of a drive belt, which is in driving engagement with a drive sprocket, driven via the electromagnetic clutch by a gear transmission from the electric motor.

So far reference has only been made to a disc brake design at one side of the brake disc, but normally disc brake actuation is performed at both sides of the brake disc. In the present case a brake yoke, force-transmittingly connected to the ramp bridge, extends to the opposite or rear side of the brake disc and is there provided with a rear pad holder with a rear brake pad for braking engagement with the brake disc.

In a first embodiment the ramp bridge is attached to a fixed part of a vehicle chassis in which the disc brake is arranged, and the brake disc is axially movably arranged on its shaft.

In a second embodiment the ramp bridge is floatingly arranged in relation to a vehicle chassis in which the disc brake is arranged and axially guided in relation to the brake disc, and the brake disc may be axially fixed to its shaft.

Means may herewith be provided for adjusting the position of the brake yoke in relation to the ramp bridge for accomplishing a slack adjustment in relation to the wear of the rear brake pad.

Practically, this may be obtained in that the drive belt also extends over adjustment nuts rotatably arranged in the ramp bridge and threadingly engaging second adjustment screws at the respective ends of the brake yoke.

For different reasons, among other things that an improved control over the distribution of the pad wear may be obtained, it may be of advantage to arrange slack adjusting means at both sides of the brake disc. In a disc brake as described above, rear slack adjusting means for the rear brake pad may be arranged in the rear part of the brake yoke and may be driven by the same arrangement that is driving the slack adjusting means for the front brake pad.

A rotatable transmission bar for the rear slack adjusting means may extend through the brake yoke from its front part to its rear part, and a rotatable adjustment bar or drive belt may extend drivingly from the transmission bar in the rear part of the brake yoke for driving the slack adjusting means.

In a first practical embodiment, wedge-shaped adjustment members in engagement with corresponding, slanted internal surfaces in the rear part of the brake yoke can be transferred by the adjustment bar for advancing the rear brake pad.

In a second practical embodiment, third adjustment nuts, rotatably drivable by the adjustment rod or drive belt, can be in thread engagement with non-rotatable adjustment screws connected to the rear brake pad.

Axial force sensing means may be arranged in the brake force transmitting chain between the ramp bridge and the rear pad holder.

Alternatively or additionally, tangential force sensing means are arranged at suitable locations in the disc brake.

BRIEF DESCRIPTION OF THE DRAWINGS

The invention will be described in further detail below under reference to the accompanying drawings, in which FIGS. 1-10 are schematical top views, partly in section, of ten embodiments of a disc brake according to the invention.

DETAILED DESCRIPTION OF THE INVENTION

Figure 1:
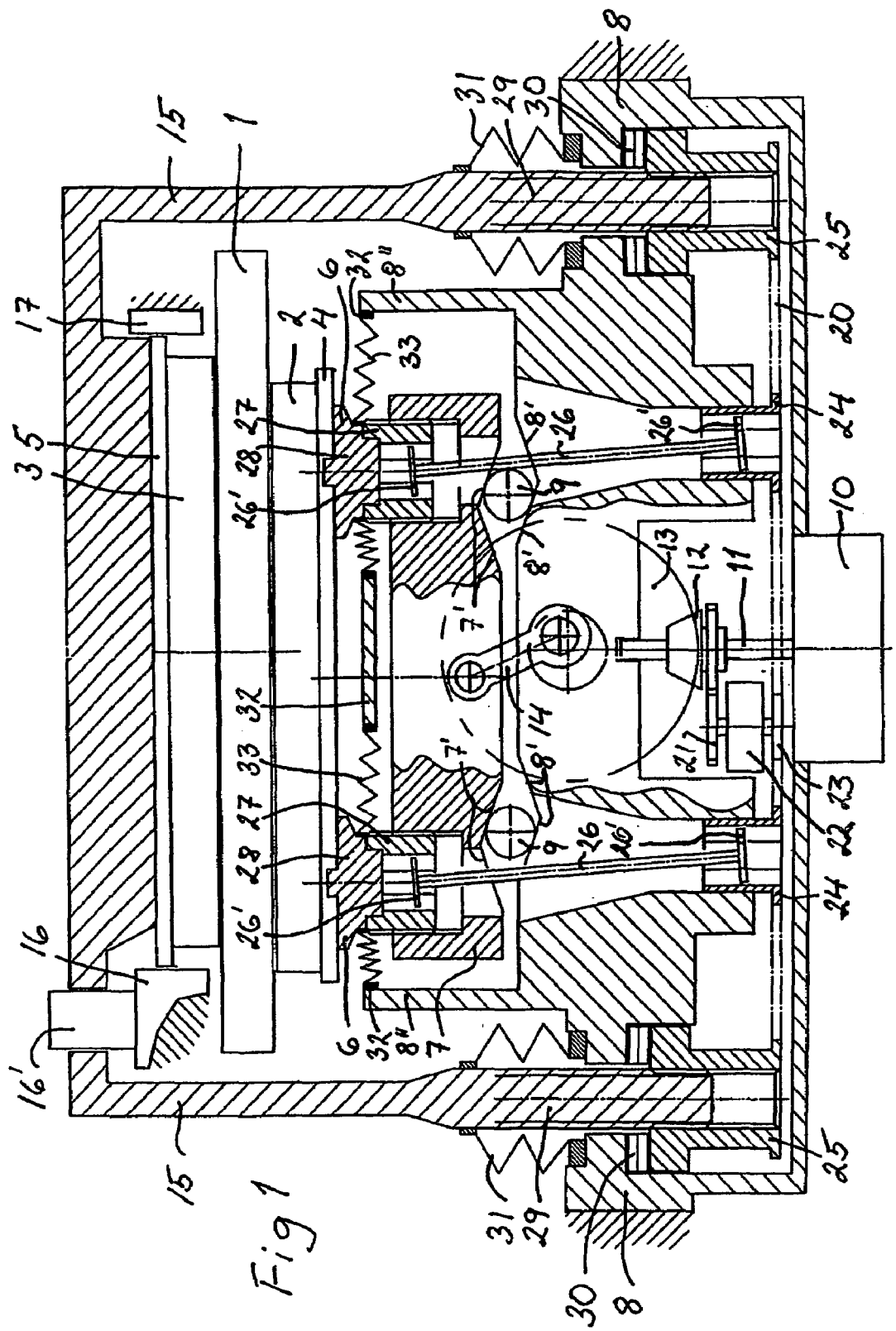

In a vehicle chassis, a disc brake shown in a first embodiment in FIG. 1 is placed astraddle of a rotatable brake disc 1, which is to be brakingly engaged by a front brake pad 2 and a rear brake pad 3. These brake pads 2 and 3 are attached to a front and a rear brake pad holder 4 and 5, respectively. The rear brake pad holder 5 is attached to a brake yoke 15 to be described. The brake pads may alternatively lack separate pad holders.

It will appear that in this first embodiment the disc brake is fixedly attached in the vehicle chassis, which means that the brake disc 1 must have a certain (although limited) axial movability in relation to the disc brake (namely in the practical case in relation to its shaft).

By adjustable distance means 6 to be described below the front brake pad holder 4 is attached to a ramp plate 7. The ramp plate 7 is in turn connected to a ramp bridge 8 by means of application members, namely in the shown case rollers 9 between ramps 7' and 8' on the ramp plate 7 and the ramp bridge 8, respectively. The rollers 9 are preferably arranged in a common roller cage (not shown) for obtaining full control and a completely synchronous movement of the rollers 9 (irrespective of their actual number). The need for a roller cage is especially relevant, if the ramps 7' and 8' are curved for obtaining certain brake characteristics.

The ramps 7' and 8' are exposed to high forces and much wear and can therefore be constructed as inserts of harder and higher quality material.

Other application members than the rollers 9 are feasible, such as tiltable parallelepipedical members in correspondingly shaped recesses in the ramp plate and the ramp bridge.

The ramp bridge 8 is fixedly attached in the vehicle chassis and is provided with means for creating a control force and for maintaining a certain predetermined slack between on one hand the brake disc 1 and on the other hand the brake pads 2 and 3.

An electric motor 10 on the ramp bridge 8 can rotate a motor shaft 11 in either direction. (The unit called "electric motor" also preferably contains a gear box for reducing the rotational speed from the motor as well as a parking and safety brake arrangement.)

A bevel gear 12 arranged on the motor shaft 11 is in driving gear engagement with a bevel gear disc 13 rotationally supported by the ramp bridge 8. Eccentrically connected to the bevel gear disc 13 is a crank rod 14 pivotally connected to the ramp plate 7.

By turning the bevel gear disc 13 in either direction by means of the bevel gear 12 from the motor 10, the position of the ramp plate 7 in relation to the ramp bridge 8 can be set. When a friction engagement between on one hand the brake pad 2 (and brake pad 3, as will be described) and on the other hand the brake disc 1 has been established (over the distance means 6 between the ramp plate 7 and the brake pad holder 4), an application force amplification will be accomplished by the rollers 9 climbing their ramps 7' and 9' in response to a tangential movement of the ramp plate 7 caused by the friction engagement with the brake disc 1. The application force may be accurately controlled by rotating the motor 10 in either direction.

With the exception of a slack adjusting function to be described, the rear brake pad holder 5 with its rear brake pad 3 is fixedly connected to the ramp bridge 8 by means of a brake yoke 15.

Axial guiding of the brake yoke 15 and reaction force handling from the braking may either be accomplished by a first guide element 16 as shown to the left in FIG. 1 or by a second guide element 17 as shown to the right in FIG. 1, both fixed in the vehicle chassis. Both guide elements 16 and 17 have axial surfaces for handling reaction forces from the brake pad holder 5. The first guide element 16 has an axial guide pin 16' cooperating with a hole in the brake yoke 15 for axial guiding of the latter, whereas the second guide element 17 guidingly cooperates with an axial surface of the brake yoke 15. Throughout this specification, the term "axial" refers to the axial direction of the brake disc 1.

The slack adjusting arrangement for the two brake pads 2 and 3 will now be described. The entire arrangement is driven by the electric motor 10 over a drive belt 20, a drive chain or the like via a gear transmission 21 from the motor shaft 11, an electromagnetic clutch 22 and a drive sprocket 23 in driving engagement with the drive belt 20. The electromagnetic clutch 22 is only engaged, when a slack adjustment is desired. The drive belt 20 may be replaced by a gear train.

The drive belt 20 drives two adjustment sleeves 24, which are rotatably arranged in the ramp bridge 8 and are intended for the slack adjustment of the front brake pad 2, and two adjustment nuts 25, which also are rotatably arranged in the ramp bridge 8 but are intended for the slack adjustment of the rear brake pad 3.

An adjustment rod 26 has end means 26' in form engagement with one of the adjustment sleeves 24 and with one of two first adjustment screws 27, each in thread engagement with a bore in the ramp plate 7. The connection by the rod 26 means that the adjustment movement may be transmitted in spite of relative movements between the ramp plate 7 and the ramp bridge 8. The first adjustment screw 27 is rotatably connected to a socket 28 non-rotatably attached to the brake pad holder 4 in such a way that the transmission of tangential forces is secured.

The first adjustment screw 27 and the socket 28 together form the distance means 6 with a length adjusted after the wear of the front brake pad 2.

Each end of the brake yoke 15 is formed as a second adjustment screw 29 in thread engagement with the adjustment nut 25.

The thread directions of the adjustment screws 27 and 29 are such that the distance between the two brake block holders 4 and 5 is decreased at a rotation of the electric control motor 10 for compensating for the wear of the brake pads 2 and 3 at braking. Such a slack adjusting rotation may be separate from a rotation for controlling the application of the brake.

A force sensing means 30 of any suitable kind is arranged between the adjustment nut 25 and the ramp bridge 8 in the bottom of the bore provided therein for the nut 25. Such a force sensing means 30 can transmit signals indicative of the axial brake force; such signals can be used for feed-back at braking for controlling the electric control motor 10.

A protective bellows 31 of rubber or the like is arranged between the ramp bridge 8 and the brake yoke 15 around each second adjustment screw 29 for preventing the intrusion of moist, dirt and the like.

Further, at the side facing the brake pad holder 4 the interior of the disc brake mechanism is protected against the intrusion of moist, dirt and the like in the following way. The ramp bridge 8 has a circumferential wall or sidewall 8" extending towards the brake pad holder 4. In its opening, which has a considerably larger length (in the plane of the drawing) than width (transversely thereto) a lid 32 is attached. The lid 32 is provided with generally circular openings, in which outer peripheries of bellows 33 of rubber or the like are attached, whereas the inner peripheries thereof are attached to the sockets 28. These generally circular bellows will without problems allow lateral and axial movements of the first adjustment screws 27 and the sockets 28.

Figure 2:
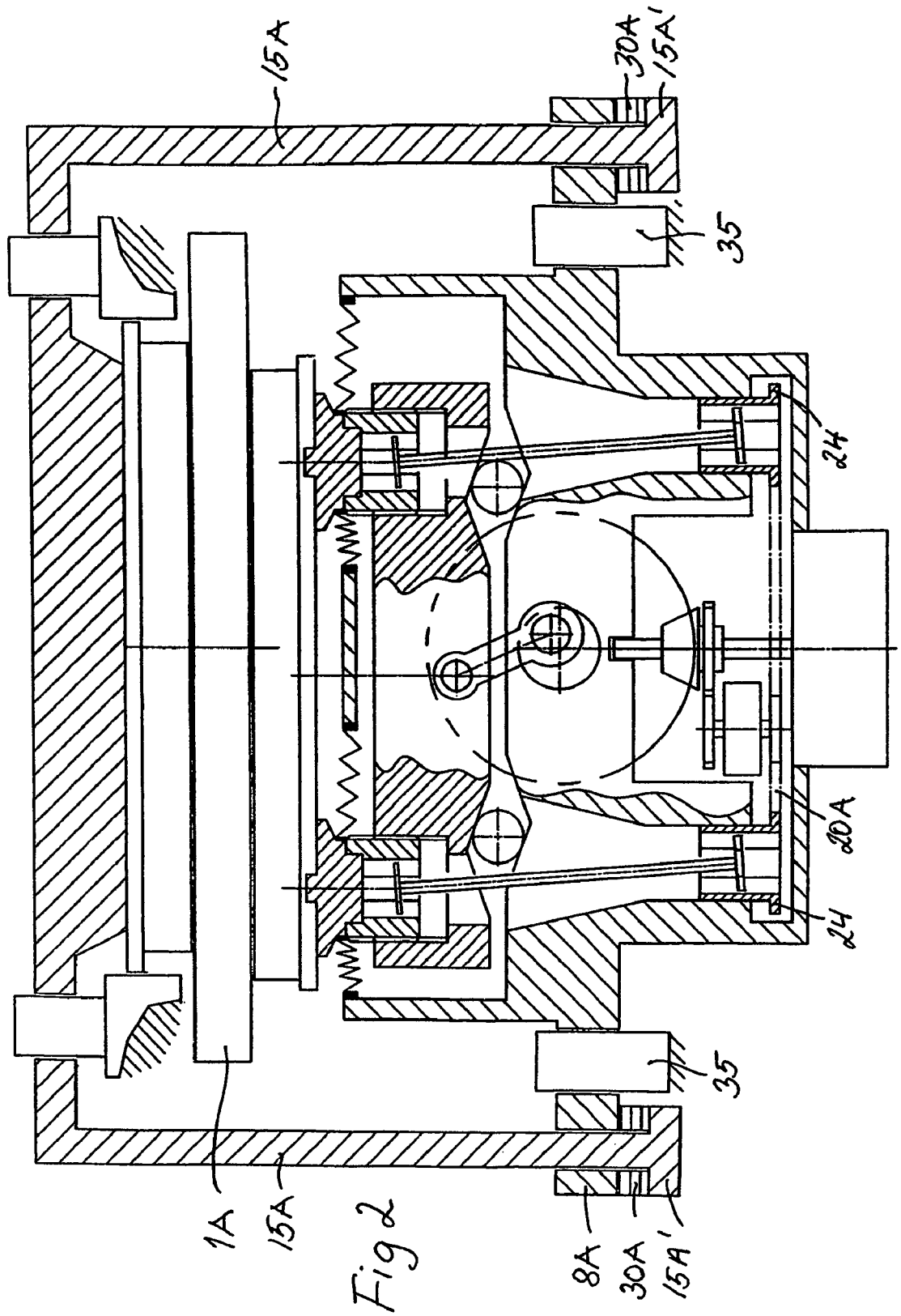

A second embodiment of a disc brake according to the invention is shown in FIG. 2. This second embodiment has great similarities with the first embodiment according to FIG. 1. The description of the second embodiment will in principle be limited to those portions where there are differences in relation to the first embodiment, and for the sake of clarity FIG. 2 is only provided with a minimum number of reference numerals (which is also true for FIGS. 3-10).

The main difference of the disc brake according to the second embodiment in relation to the first one is that it is of the floating type, i e its brake disc 1A is not axially movable on its shaft (not shown). The floating disc brake is instead guided by axial guide pins 35, which are attached in the vehicle chassis and extend through corresponding holes in the ramp bridge 8A.

The brake yoke 15A extends through holes in the ramp bridge 8A and is provided with flanges 15A' for handling pull forces. Force sensing means 30A for providing signals indicative of the axial brake forces are arranged between the ramp bridge 8A and the brake yoke flanges 15A'.

The slack adjustment is only performed at one side of the brake disc 1A (the mechanism side or front side), as the disc brake is floating and the slack will be distributed at both sides. This means that the drive belt 20A for the slack adjusting arrangement only drives the adjustment sleeves 24.

Figure 3:
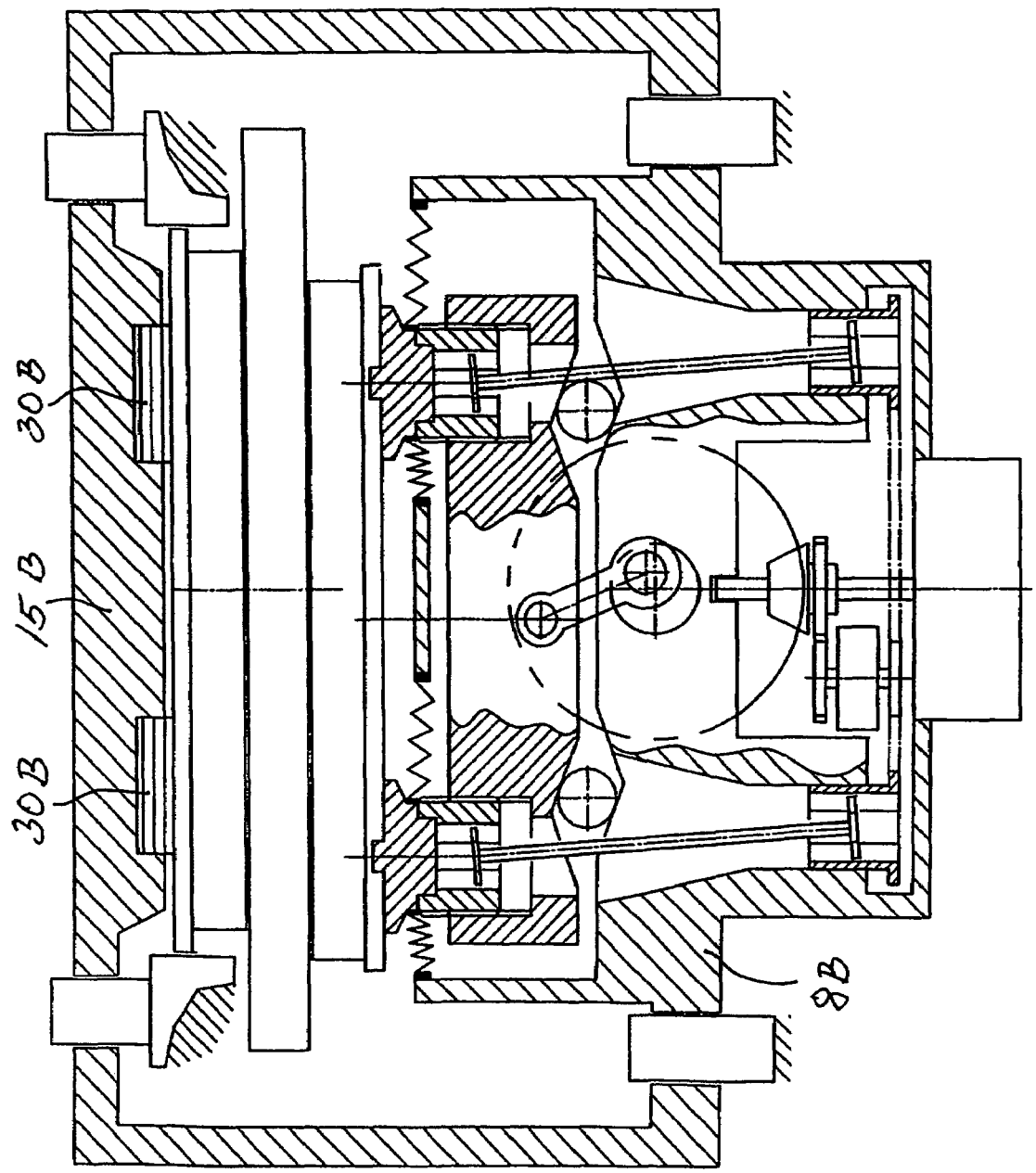

A third embodiment of the invention is shown in FIG. 3. This embodiment is closely similar to the second embodiment of FIG. 2, and the disc brake accordingly again is of the floating type. The only difference in relation to the second embodiment is the location of the force sensing means for providing signals indicative of the axial brake force. These means 30B are in this case situated between the rear brake pad holder 5 and the brake yoke 15B, which here is integrated with the ramp bridge 8B.

Figure 4:
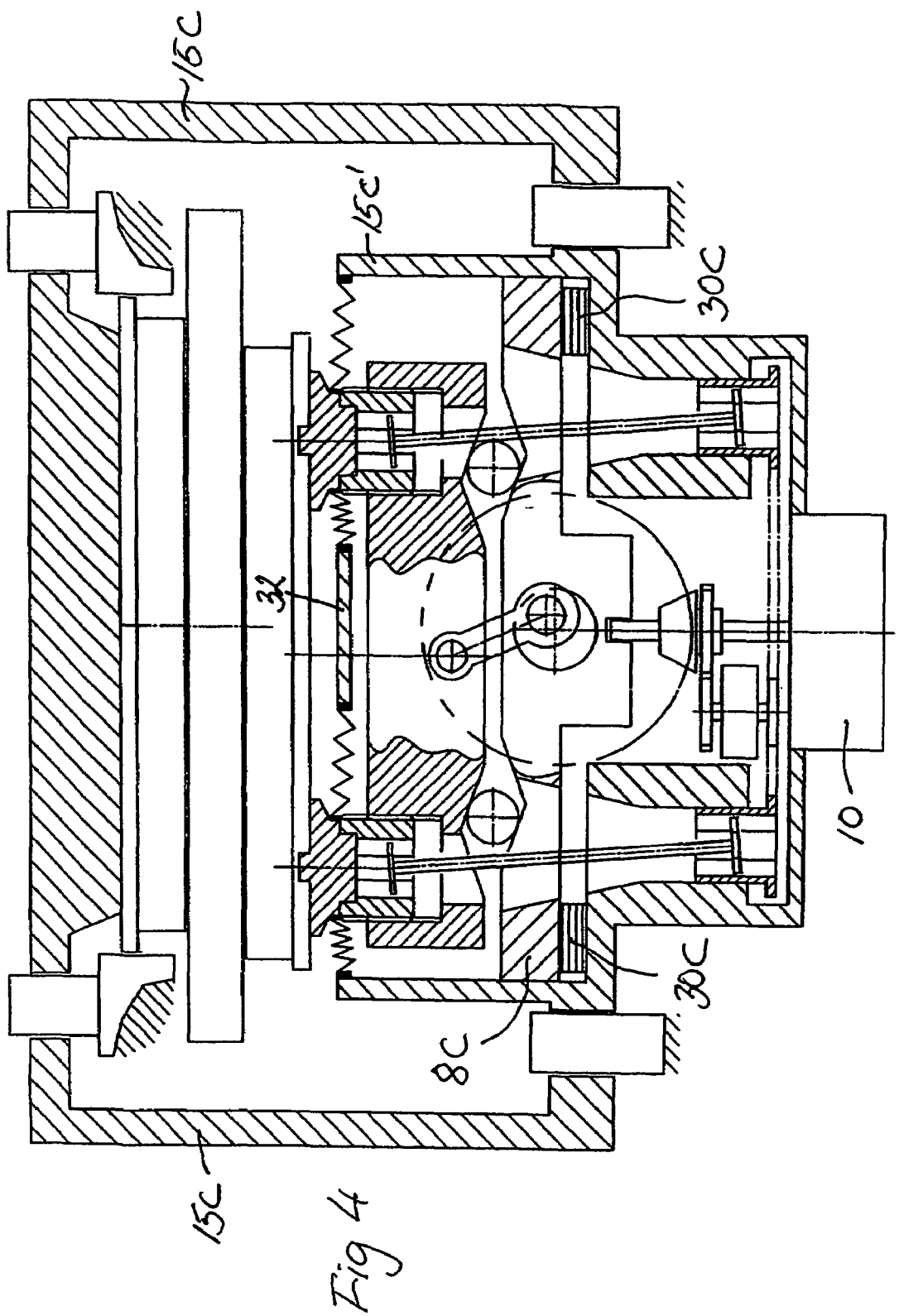

A fourth embodiment is shown in FIG. 4. Again, it is mainly the design of the force sensing means that differs in relation to the second embodiment of FIG. 2. The disc brake is also here of the floating type. The axial force sensing means 30C are arranged between the ramp bridge 8C, which in this case is a smaller, separate unit than in the other embodiments, and the brake yoke 15C, that here extends all around the disc brake. The ramp bridge 8C is axially guided by the brake yoke 15C for minute movements allowed by the force sensing means 30C. The electric motor and associated elements are here connected to the brake yoke 15C but are otherwise of the same design as has been described above. The circumferential wall or sidewall, to which the lid 32 is attached, is in this case integral with the brake yoke 15C and is accordingly given the reference numeral 15C'.

Figure 5:
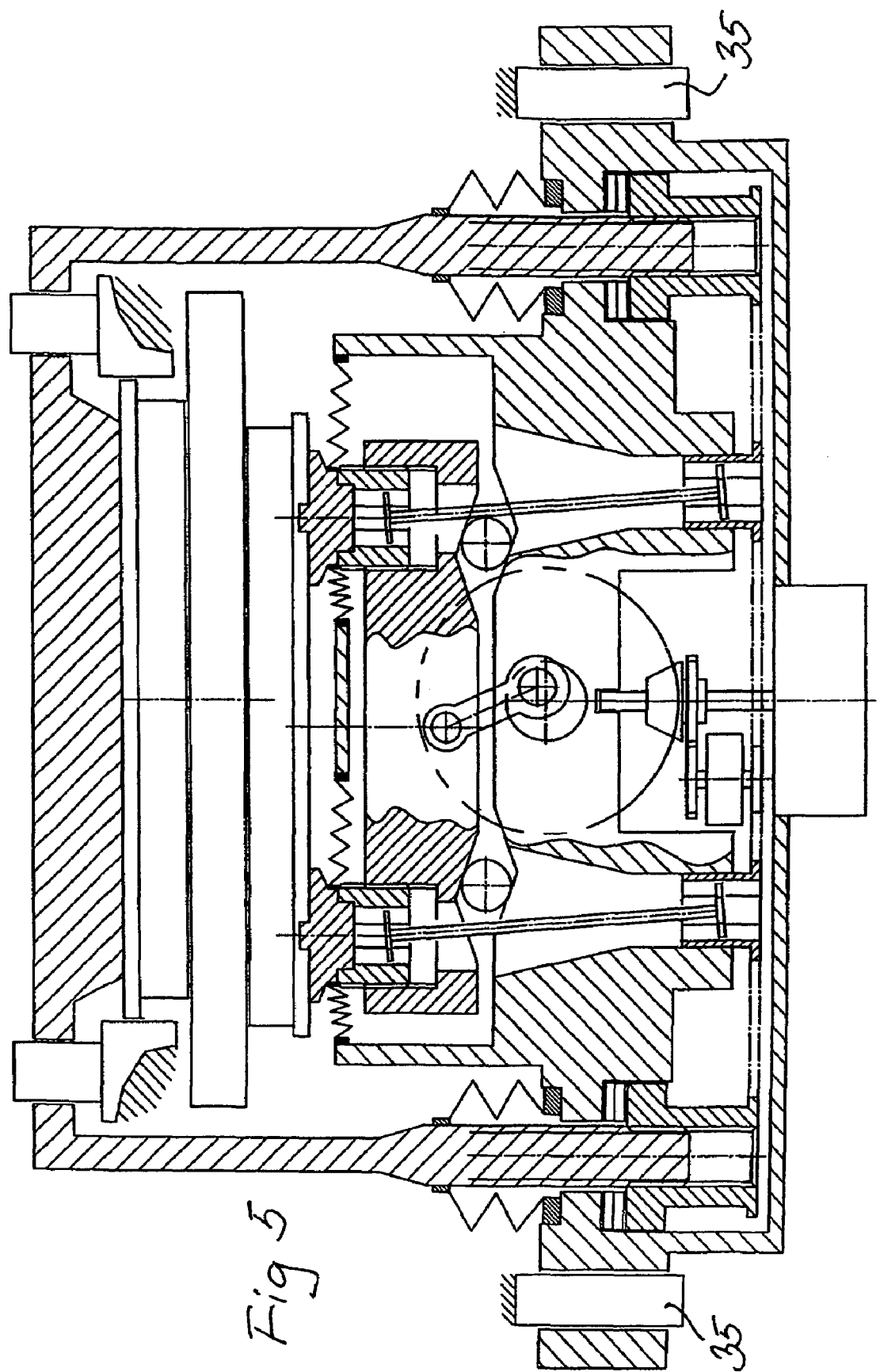

A fifth embodiment is shown in FIG. 5. The disc brake shown therein is of the floating type. This means that the brake disc is not axially movable on its shaft, but that the disc brake itself is axially movable in relation to guide pins 35. Apart from that it has the same design as the first embodiment of FIG. 1 with slack adjustment at both sides, which means that the distribution of the slack at both sides of the disc is controlled (in contrast to the second embodiment according to FIG. 2, with which it otherwise has close similarities).

Figure 6:
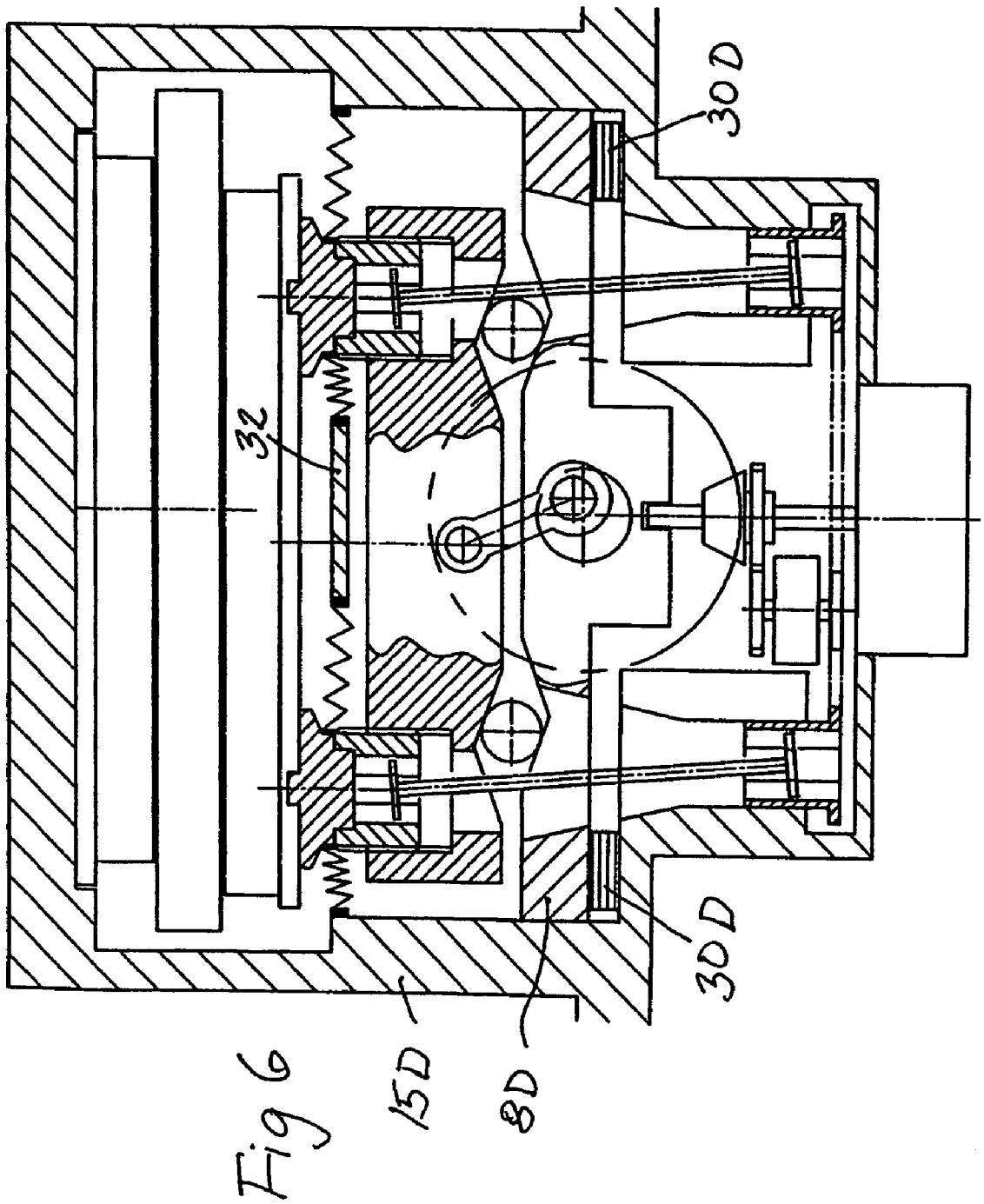

A sixth embodiment is shown in FIG. 6. The disc brake shown therein is of the fixed type, and slack adjusting is only provided at one side of the brake disc, which means that the disc has to be axially movable on its shaft. Apart from that the sixth embodiment has closest similarities with the one of FIG. 4, for example with regard to the position of the axial force sensing means 30D between the ramp bridge 8D and the fixed brake yoke 15D. The lid 32 is attached in the brake yoke 15D.

Figure 7:
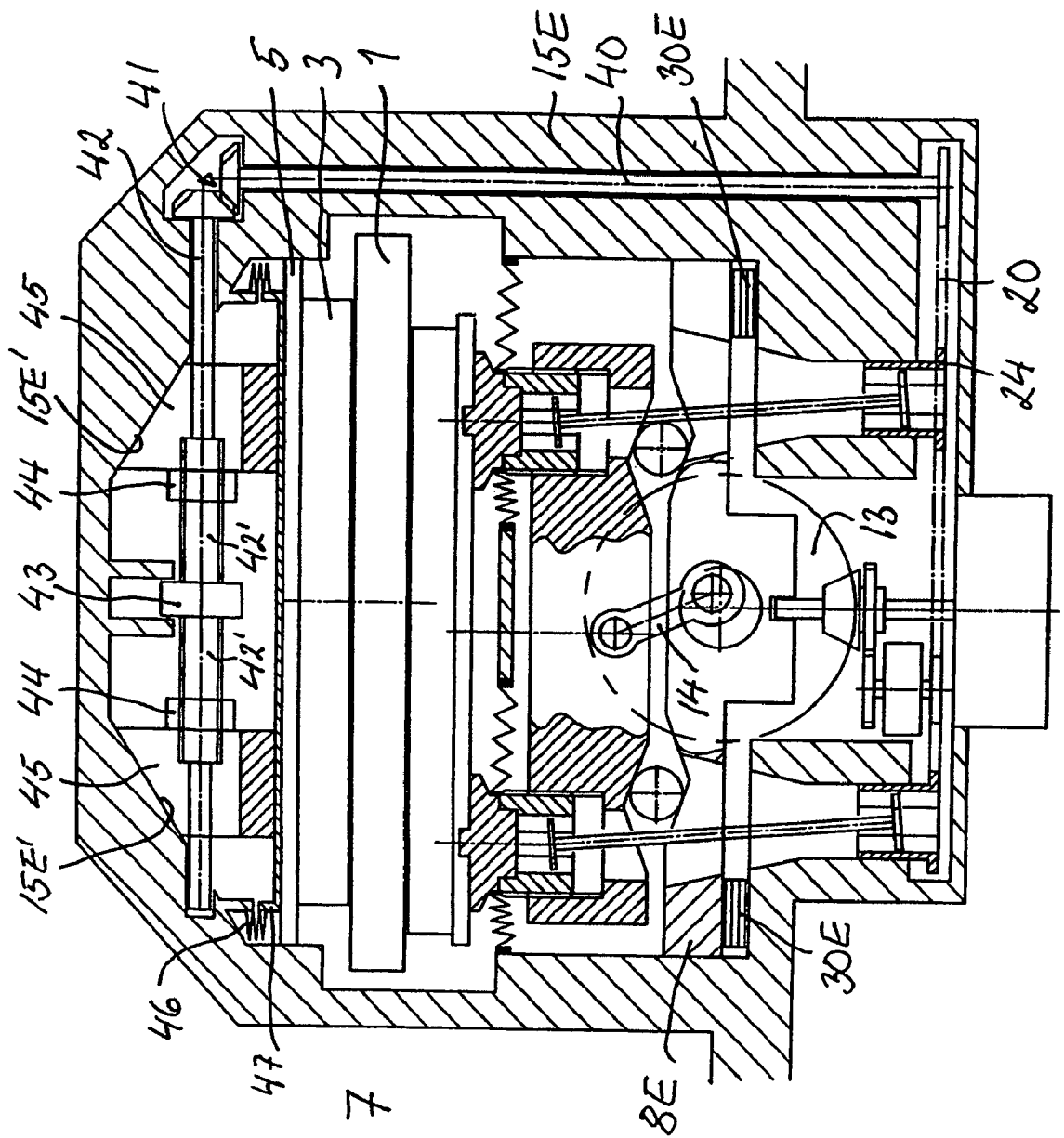

A seventh embodiment is shown in FIG. 7. Also this disc brake is of the fixed type, but—as will be further described—slack adjusting is provided at both sides of the brake disc, which means that the latter only needs to have a certain axial movability in relation to its shaft.

A transmission bar 40 is rotatably arranged in the brake yoke 15E and extends to the rear side of the brake disc 1. The transmission bar 40 is shown as driven directly by the drive belt 20, but may alternatively in a more space-consuming way be driven via the inner part of the right adjustment sleeve 24. The transmission bar 40 is provided at its opposite end with a worm gear or bevel gear 41 transferring the rotative movement to an adjustment bar 42, which is rotatably arranged in the brake yoke 15E and is shown as being axially guided by being provided with a guide flange 43 in engagement with corresponding portions of the brake yoke 15E. (Alternatively, the adjustment bar 42 may be axially guided at its ends.) At either side of the guide flange 43 the adjustment bar 42 is provided with external threads 42' having opposite thread directions. An axially movable, but non-rotatable nut 44 is in engagement with each thread 42'.

A wedge-shaped adjustment member 45 is axially movably arranged at either side of the guide flange 43 in a space confined by the rear pad holder 3, the nut 44 and a slanted (or wedge-shaped) internal surface 15E' of the brake yoke 15E. The design is such that when the adjustment members 45 are pressed apart by the nuts 44 at adjustment rotation of the adjustment bar 42, the rear pad holder 5 will be advanced downwards in FIG. 7 to compensate for the wear of the rear brake pad 3 at that side of the brake disc 1.

The brake force sensing means 30E are arranged at the same positions as in the embodiment according to FIG. 4.

The lid 32 is arranged in the same way as in the embodiment according to FIG. 6.

A bellows 46 of rubber or any other suitable material is arranged to protect the slack adjusting mechanism 42-45 at the rear side of the brake disc 1. The bellows 46 is shown as being attached to flanges of a plate cup 47 at the back side of the rear pad holder 5.

Figure 8:
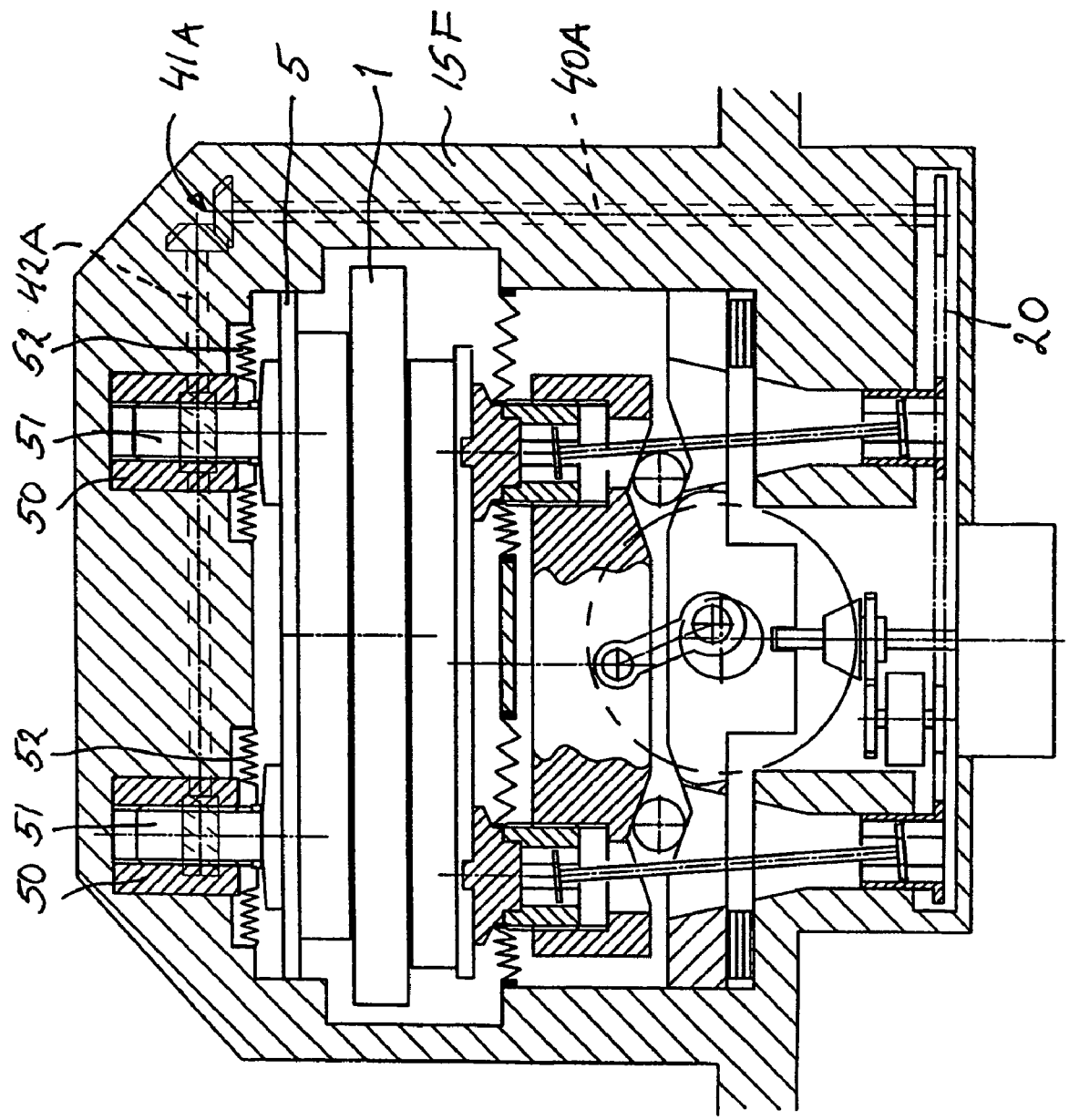

An eighth embodiment is shown in FIG. 8. Basically, this embodiment is the same as the seventh embodiment but differs therefrom with regard to the design of the slack adjusting means at the rear side of the brake disc.

A transmission bar 40A, driven by the drive belt 20, drives an adjustment bar 42A over a worm gear or bevel gear 41A. The adjustment bar 42A is in drive engagement with the exteriors of third adjustment nuts 50, which are rotatably arranged in the brake yoke 15F in the axial direction of the brake disc 1 or in other words perpendicular to the adjustment bar 42A. Adjustment screws 51 attached to the rear pad holder 5 are in thread engagement in the third adjustment nuts 50.

Bellows 52 of rubber or any other suitable material protect the rear slack adjusting mechanism 50, 51 against the intrusion of moist, dirt and the like.

Figure 9:
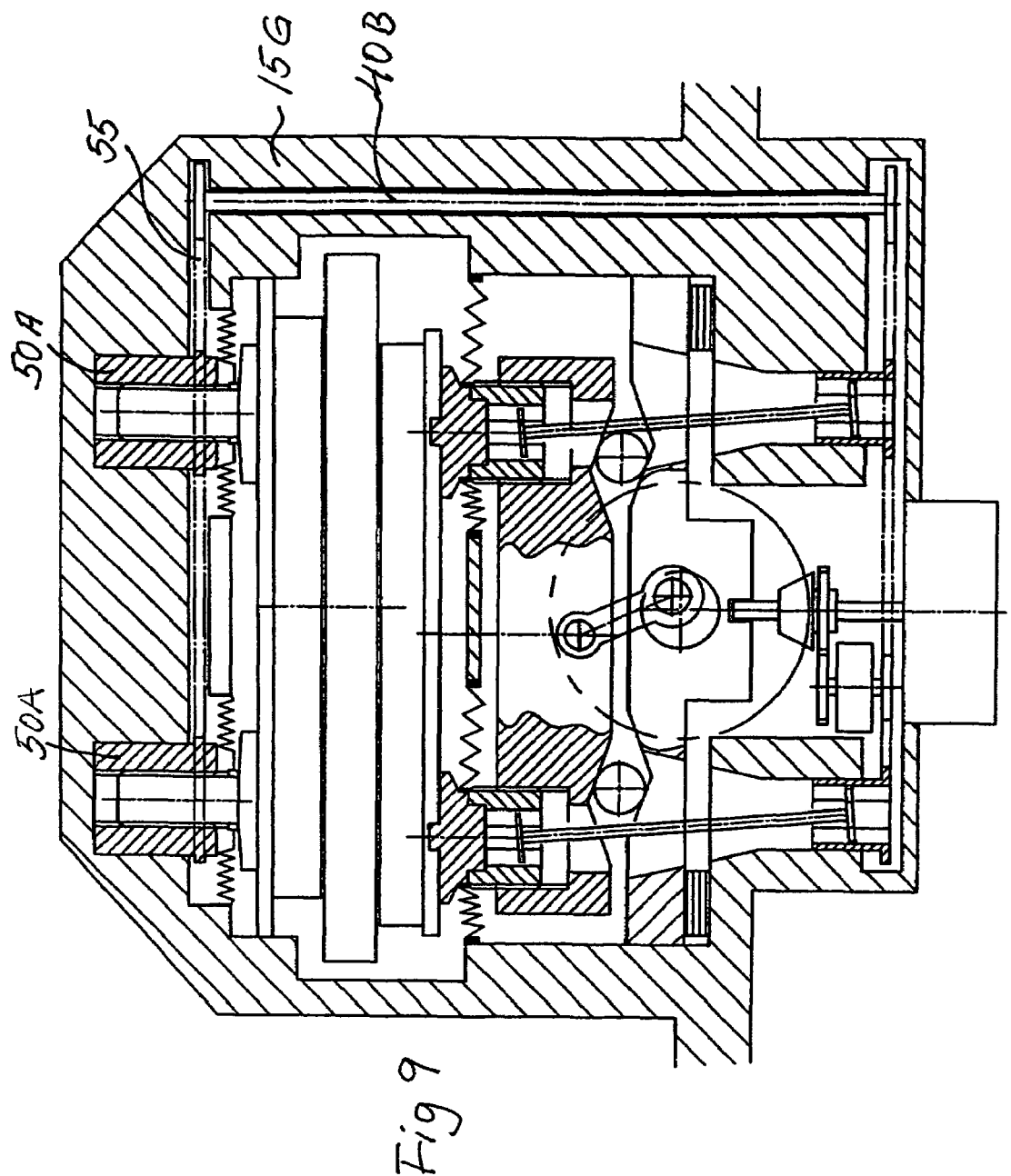

A ninth embodiment is shown in FIG. 9. Basically, also this embodiment is the same as the seventh embodiment of FIG. 7, but in its practical design it is closely similar to the eighth embodiment of FIG. 8. The difference lies in the rotative driving of the third adjustment nuts 50A, which here is performed by a drive belt 55 in the brake yoke 15G from the transmission bar 40B.

A tenth embodiment is shown in FIG. 10. This embodiment has closest similarities with the one according to FIG. 7, and reference is made to the description thereof for the general design also of the present embodiment. As in all other embodiments, the bevel gear disc 13 (with its eccentric journalling for the crank rod 14) is journalled in the ramp bridge 8E. In the FIG. 10 embodiment on the other hand, this journalling occurs in the brake yoke 15H or housing itself, so that the ramp plate 8H does not directly partake in the transmission of the control force.

A few examples have been given of where axial force sensing means may be situated in the design, but other alternatives are of course possible.

In some cases it may be preferred to alternatively or additionally assess the tangential brake force. Such an assessment may for example be made, at least in the second to fifth embodiments (according to FIGS. 2-5) with floating disc brake designs, at the fixed guide pins 16 and 35 for the disc brake. Alternatively, strain gauges suitably situated on or in the brake yoke 15 may be used for this purpose. Other alternatives are possible, as will be understood by a person skilled in the art.

It should be observed that reference has above only been made to slack adjusting as a compensation for the wear of the brake pads; in reality also the brake disc is worn calling for a certain compensation by the slack adjusting means.

Further, reference has above only been made to the existance of one brake disc, with which each disc brake is constructed to cooperate. However, as known in the art, it is possible to have more than one disc, with which each disc brake is constructed to cooperate, and such multi-disc arrangements may also be within the scope of the present invention.

Other modifications are possible within the scope of the appended claims.

What is claimed is:

1. A disc brake with self-servo effect, comprising:
    a movable ramp plate connected to a front brake pad for engagement with a brake disc,
    a ramp bridge, connected to the ramp plate,
    means for imparting a control movement to the ramp plate,
    application members between the ramp plate and the ramp bridge for increasing the mutual distance—in the axial direction of the brake disc—between the ramp plate and the ramp bridge by a relative movement of the ramp plate in the tangential direction of the brake disc,
    characterized in that slack adjusting means for compensating for the wear of the front brake pad are arranged between the ramp plate and the front brake pad, and
    wherein the slack adjusting means comprise at least one first adjustment screw in thread engagement with a corresponding bore in the ramp plate and rotatably connected to a front pad holder for the front brake pad.

2. A disc brake according to claim 1, wherein the first adjustment screw is rotatably connected to a socket attached to the pad holder.

3. A disc brake according to claim 1, wherein the first adjustment screw is controllably connected to the means for imparting a control movement.

4. A disc brake according to claim 3, wherein a rotative movement may be transmitted at will from an electric motor—of the means for imparting a control movement—to the first adjustment screw via an adjustment rod in form engagement with the first adjustment screw for allowing movements of the ramp plate.

5. A disc brake according to claim 4, wherein an electromagnetic clutch is arranged in the force transmitting chain from the electric motor to the adjustment rod.

6. A disc brake according to claim 1, wherein there are two first adjustment screws.

7. A disc brake according to claim 1, wherein a brake mechanism opening facing the brake disc is sealed against the intrusion of moisture and dirt by means of a lid, which is attached to a sidewall defining the opening and which is provided with at least one generally circular hole for the slack adjusting means, in which hole a sealing bellows is arranged around the adjusting means.

8. A disc brake according to claim 5, wherein the adjustment rod is in form engagement with an adjustment sleeve, rotatable by means of a drive belt, which is in driving engagement with a drive sprocket, driven via the electromagnetic clutch by a gear transmission from the electric motor.

9. A disc brake according to claim 1, wherein a brake yoke, force-transmittingly connected to the ramp bridge, extends to the rear side of the brake disc and there is provided with a rear pad holder with a rear brake pad for braking engagement with the brake disc.

10. A disc brake according to claim 9, wherein the ramp bridge is connected to a fixed part of a vehicle chassis in which the disc brake is arranged and the brake disc is axially movably arranged on its shaft.

11. A disc brake according to claim 9, wherein rear slack adjusting means for the rear brake pad are arranged in the rear part of the brake yoke and are driven by the same arrangement that is driving the slack adjusting means for the front brake pad.

12. A disc brake according to claim 11, wherein a rotatable transmission bar for the rear slack adjusting means extends through the brake yoke from its front part to its rear part.

13. A disc brake according to claim 11, wherein a rotatable adjustment bar or drive belt extends drivingly from the transmission bar in the rear part of the brake yoke for driving the slack adjusting means.

14. A disc brake according to claim 13, wherein wedge-shaped adjustment members in engagement with corresponding, slanted internal surfaces in the rear part of the brake yoke can be transferred by the adjustment bar for advancing the rear brake pad.

15. A disc brake according to claim 9, wherein axial force sensing means are arranged in the brake force transmitting chain between the ramp bridge and the rear pad holder.

16. A disc brake according to claim 9, wherein tangential force sensing means are arranged at suitable locations in the disc brake.

17. A disc brake according to claim 1, wherein the application members are rollers movable in ramps in surfaces facing each other of the ramp plate and the ramp bridge.

18. A disc brake with self-servo effect, comprising:
 a movable ramp plate connected to a front brake pad for engagement with a brake disc,
 a ramp bridge, connected to the ramp plate,
 means for imparting a control movement to the ramp plate,
 application members between the ramp plate and the ramp bridge for increasing the mutual distance—in the axial direction of the brake disc—between the ramp plate and the ramp bridge by a relative movement of the ramp plate in the tangential direction of the brake disc,
 characterized in that slack adjusting means for compensating for the wear of the front brake pad are arranged between the ramp plate and the front brake pad,
 wherein the slack adjusting means comprise at least one first adjustment screw to which a rotative movement may be transmitted via an adjustment rod in form engagement with the at least one first adjustment screw for allowing movements of the ramp plate.

19. A disc brake according to claim 18, wherein the slack adjusting means are driven by an electric motor.

20. A disc brake according to claim 19, wherein the electric motor is part of said means for imparting a control movement to the ramp plate.

21. A disc brake with self-servo effect, comprising:
 a movable ramp plate connected to a front brake pad for engagement with a brake disc,
 a ramp bridge, connected to the ramp plate,
 means for imparting a control movement to the ramp plate,
 application members between the ramp plate and the ramp bridge for increasing the mutual distance—in the axial direction of the brake disc—between the ramp plate and the ramp bridge by a relative movement of the ramp plate in the tangential direction of the brake disc,
 characterized in that slack adjusting means for compensating for the wear of the front brake pad are arranged between the ramp plate and the front brake pad,
 wherein the slack adjusting means comprise at least one first adjustment screw in thread engagement with a corresponding bore in the ramp plate and rotatably connected to a front pad holder for the front brake pad,
 wherein a brake yoke, force-transmittingly connected to the ramp bridge, extends to the rear side of the brake disc and there is provided with a rear pad holder with a rear brake pad for braking engagement with the brake disc, and
 wherein axial force sensing means are arranged in the brake force transmitting chain between the ramp bridge and the rear pad holder.

* * * * *